United States Patent
Schildkraut

[11] 3,752,584
[45] Aug. 14, 1973

[54] ATTENUATED TOTAL REFLECTION SPECTROSCOPIC DEVICE

[75] Inventor: Elliot R. Schildkraut, Cambridge, Mass.

[73] Assignee: Block Engineering, Inc., Cambridge, Mass.

[22] Filed: Mar. 7, 1972

[21] Appl. No.: 232,560

[52] U.S. Cl................. 356/74, 250/218, 350/96 B, 356/244, 356/246
[51] Int. Cl.............................................. G01j 3/42
[58] Field of Search...................... 356/74, 244, 246; 350/96 R, 96 B; 250/218

[56] References Cited
UNITED STATES PATENTS
3,433,570  3/1969  Hansen............................. 356/74 X
3,513,319  5/1970  Broerman.................... 350/96 B UX OTHER PUBLICATIONS
Harrick, N. J. Internal Reflection Spectroscopy, New York, Interscience Publishers, 1967, pages 205 and 206.

Primary Examiner—David Schonberg
Assistant Examiner—F. L. Evans
Attorney—Robert J. Schiller et al.

[57] ABSTRACT

A spectroscopic device and method of using attenuated total reflection techniques for analysis of samples of particulate solids in a fluid. A beam of radiation is passed through an optical cell comprising a plurality of elongated, totally internally reflecting elements, e.g., fiber optics, arranged as a mechanical filter. When fluid containing the particles is passed transversely across the cell, the latter are trapped in the filter whereupon radiation passing through the elements is selectively absorbed, thus providing an optical output having an absorption spectrum which may be utilized to identify the sample.

12 Claims, 4 Drawing Figures

PATENTED AUG 14 1973 3,752,584

ATTENUATED TOTAL REFLECTION SPECTROSCOPIC DEVICE

This invention relates to spectroscopy and more particularly to the spectral examination of dilute suspensions of particulate solids or liquids in a fluid, e.g. an aerosol.

Various systems known for analyzing particulate samples suspended in a fluid, have disadvantages. Typically, they are often costly and impractical. In one method the solids of interest are collected and removed from the suspension, and the settled matter is then subjected to chemical analysis. In another method, the sample is subjected to spectroscopic analysis in an optical cell. Such methods often exhibit insufficient sensitivity for very small sample quantities and may be extremely time consuming. Additionally, where particles have extremely low densities, sample collection may be almost impossible.

Furthermore, such prior art systems may be prone to error. Accuracy of chemical analysis is often difficult, if not impossible, with the extremely small samples. Among other objections to known spectroscopic analytical systems are the requirements of extremely accurate optical alignment, cost of the optical cell, and difficulty in cleaning the optical cell.

The present invention therefore has as a principal object the analysis of a dilute sample of fluid-borne particulate matter, particularly through attenuated total reflection (ATR) spectroscopy.

Still another object of the invention is to provide a high-sensitivity, absorption spectroscopy system particularly adapted for analysis of dilute suspensions of particulate solids or liquids in a fluid.

Other objects of the invention will in part be obvious and will in part appear hereinafter. The invention accordingly comprises the apparatus possessing the construction, combination of elements, and arrangement of parts which are exemplified in the following detailed disclosure and the several steps and relation of one or more of such steps with respect to each of the others and the scope of the application of which will be indicated in the claims.

For a fuller understanding of the nature and objects of the present invention, reference should be had to the following detailed description taken in connection with the accompanying drawings wherein.

When a light beam, travelling in a medium of a given refractive index, arrives at an interface between the first medium and a second medium of different index of refraction, at an angle of incidence, the size of which is greater than the critical angle, total reflection of the beam will occur. However, the incident beam will also set up a wave in the second medium, and this latter wave (termed an evanescent wave) travels parallel to the interface and attenuates exponentially in a direction normal to the interface essentially extending into the second medium a distance of about one-tenth the wavelength of the light beam. If the second medium is non-absorbent, the wave eventually returns all of its energy to the reflected beam in the first body, thus making the relection truly total. However, if a second medium is absorbent, some of the energy of the evanescent wave will be extracted and the reflection is no longer truly total. This phenomenon, known as attenuated total reflection (ATR), was first applied to absorption spectroscopy in 1959 by Fahrenfort who measured the energy in the reflected beam to determine the extent of absorption by the sample. Since different media selectively absorb different amounts of radiation, they may be identified by their absorption spectrums.

Briefly, the present invention uses the phenomenon of attenuated total reflection in conjunction with a spectral sampling cell comprising a plurality of totally internally reflecting elements arranged as a mechanical filter. Thus, the invention comprises a source of exciting radiation, the aforesaid sampling cell, means for directing a flow of sample-containing fluid through the sampling cell, and means for detecting the absorption spectrum of the sample. In the present invention a sampling cell is arranged to act as a mechanical filter and also as an optical cell.

Figure 1:
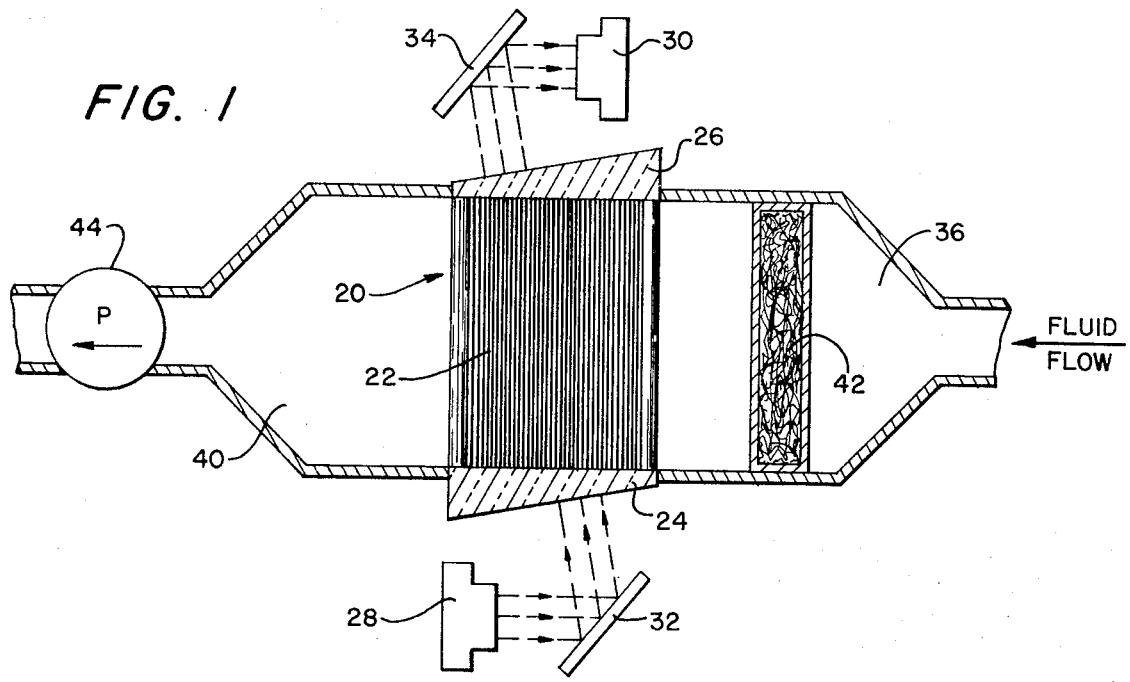
FIG. 1 is a cross-sectional schematic view of an exemplary device embodying the principles of the present invention.
Figure 2:
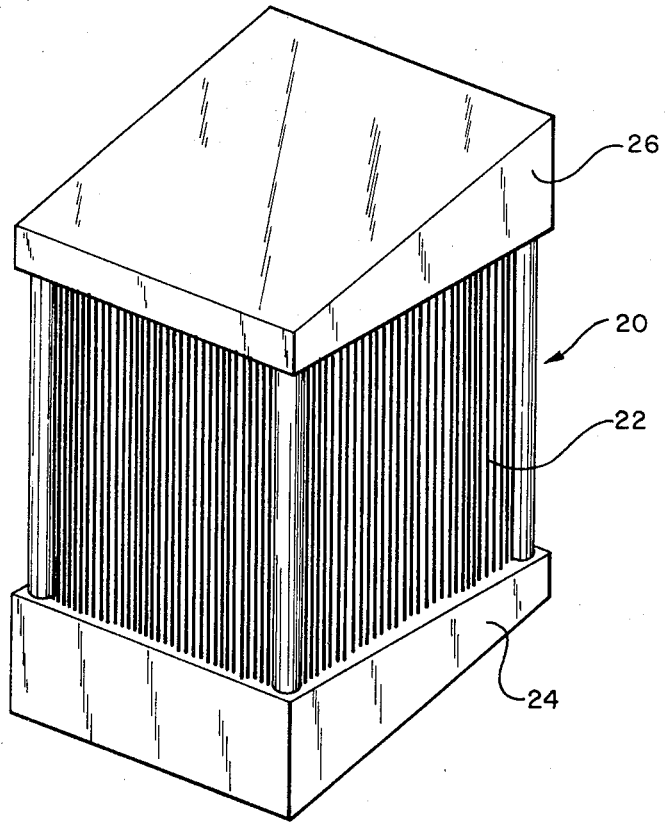
FIG. 2 is an enlarged perspective view of a sampling cell useful in the embodiment of FIG. 1.

Referring now to FIGS. 1 and 2, there is shown a device embodying the principles of the present invention and comprising spectral sampling filter cell 20. Cell 20, intended to function as both a mechanical filter and an attenuated total reflection absorption cell, comprises a plurality of elongated, totally internally reflected elements 22. One end of each of elements 22 is mechanically and optically connected to the surface of a first optical platen 24. The other end of each of elements 22 is similarly connected to a second optical platen 26. Hence the two platens constitute the mechanical support for the elements 22 distributed between the platens.

Elements 22 typically are unsheathed optical fibers, which term as used herein includes light pipes of small diameter (e.g. average diameter of 50μ or less) or thin plates or flattened filaments or the like, formed of a material capable of transmitting, with minimal attenuation, the wavelengths of the radiation of interest. The fibers are preferably disposed in a tangled, random-like array so as to provide a fiber bat, but it is desirable that there be as little contact between fibers as reasonably possible. Elements 22 are coupled to the platens typically by a cement or the like which when hardened provides the requisite mechanical strength and the desired optically transmissive characteristics. It is preferred that the coupling between the platens and the fibers be such as to provide substantially minimal refraction between the platens and fibers, in order to avoid introducing chromatic effects into the exciting radiation.

The device of FIGS. 1 and 2 also includes source 28 of a beam of exciting radiation and means 30 for detecting radiation transversing elements 22 end to end by total internal reflection. The beam from source 28 (which may be any desired source of exciting radiation in which elements 22 are capable of transmitting) should be directed into elements 22 at an appropriate angle to provide total internal reflection. To this end, platens 24 and 26 can be prismatic as shown and/or auxiliary optics such as mirror 32 can be employed to direct the beam from source 28 to fibers 22 at the appropriate angle. If one wishes to further fold the path or concentrate the radiation emergent from cell 20, another mirror 34 can be employed to direct the radiation from platen 26 to detector 30.

Detector 30 is typically of the type known in the art such as a monochromator. The detector is capable of examining through an input aperture, a selected wavelength within a particular spectral range. Detector means 30 should be positioned to one side of cell 20 so as to be substantially out of the path of any radiation, either direct or scattered, except that from source 28 traversing cell 20 and reflected from mirror 34.

Completing the system are fluid-sample inlet duct 36 and output duct 40 respectively leading to and from the filter formed by the array of fibers 22 of sampling cell 20. A prefilter 42 is preferably included in duct 36 adjacent fibers 22 for removing large dust particles and other entrained solids above a desired size. Prefilter 42 typically may comprise fiber glass, steel wool or other known filter material. Output duct 40 preferably has an exhaust or vacuum pump 44 pneumatically coupled thereto.

Figure 3:
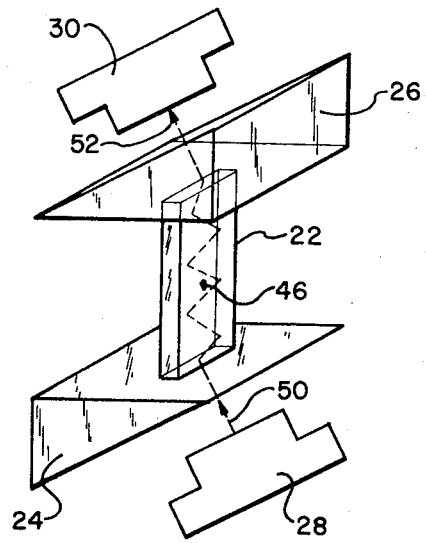
FIG. 3 is an enlarged perspective view of a single optical element of the sampling cell of the embodiment of FIG. 2.

Referring now to FIG. 3, there is shown a single particle 46 in contact with a single element 22, the size and shape of the particle and the element being greatly exaggerated for ease and clarity in illustration. In operation, exciting radiation or beam 50 from source 28 is directed through platen 24 into element 22. During the transit through element 22, the beam of radiation is normally totally internally reflected. The fluid which is to be analyzed is passed through cell 20 generally transversely to optical axes of elements 22, i.e., along the direction of "fluid flow" as indicated in FIG. 1. In passing through cell 20, particulate solids or liquids such as particle 40 in the fluid collide with or adhere to elements 22. At the point of contact between a particle 40 and an element 22, there occurs selective absorption of the evanescent wave by the particle, the absorption slightly attenuating the beam passing through that element 22.

The absorption spectrum of the particle can then be determined by examination of output beam 52. For example, detector 30 can be to examine a broad wavelength band the wavelength of input exciting beam 28 can be scanned or varied across a a wide range by a variable frequency source. Similarly, the emission spectrum of the sample can be examined by a broad bandwidth spectrum for beam 28, and then operating detector 30 to scan individual wavelengths of the output radiation. Because the absorption is a function of particle capture probability and the number of internal reflections, it is desirable to therefore use the smallest diameter fibers possible. Also, to reduce the stringency of collimation requirements at the input platen, it is desired to use as fibers, materials having the highest indexes of refraction among those available.

Figure 4:
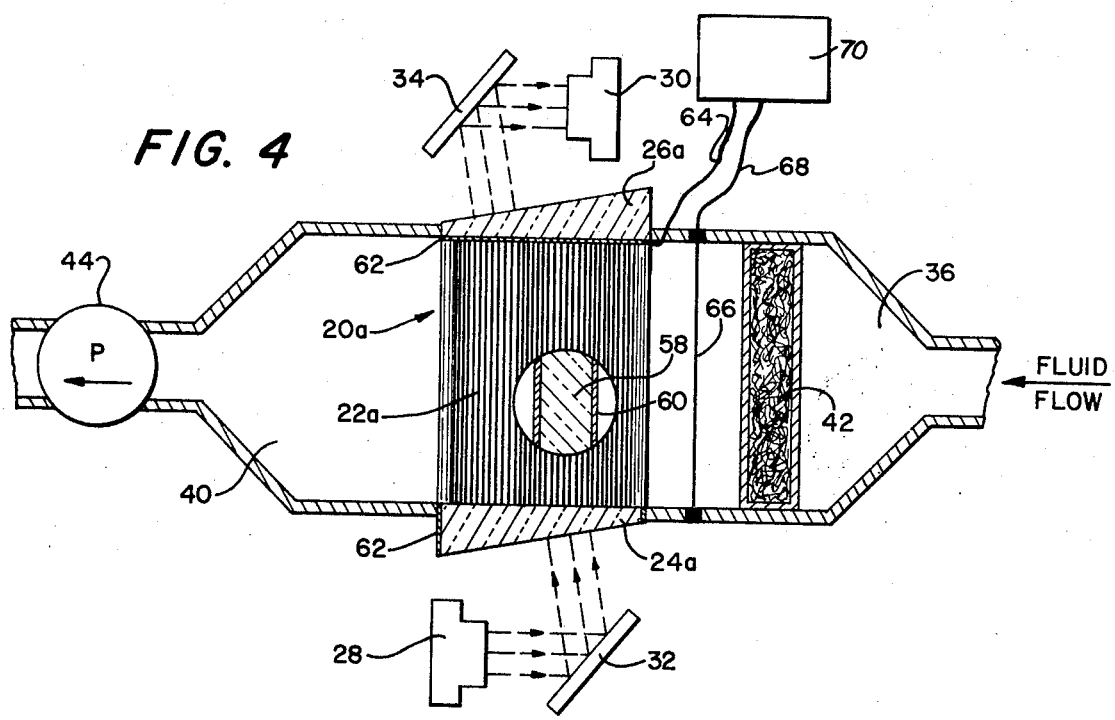
FIG. 4 is a cross-sectional view of an alternative embodiment of exemplary optical element embodying the principles of the present invention.

Referring now to FIG. 4 of the drawings, there is shown an alternative embodiment of the present invention. For convenience a single optical element 22a in cell 20a is shown greatly enlarged in part. It is understood, however, that sampling cell 20a will comprise a plurality of similar optical elements, The embodiment of FIG. 4 differs from that of FIG. 1 in that elements 22a comprise a core 58 covered with an electrically conductive coating 60, which is also optically transparent over the wavelength to be studied. The coating should either have an index of refraction which matches the substrate material of the fiber, or should be so thin as to be optically negligible in effect. For example, if core 58 is arsenic trisulfide, transmissive in the infrared at about 2.4 $\mu$, then a 100 A thick coating of palladium will be transparent to the infrared and much thinner than the penetration of the evanescent wave. The surfaces of platens 24a and 26a, at least around the junctions of the fibers and one of the platens. Also include an electrically conductive coating to provide electrical connectivity to the fibers without impairing optical transmission between source 28 and detector 30. One may, on the platens use materials such as tin oxide and the like as coating 62. Coatings 60 and 62 are electrically connected to one another, and through line 64 to one pole of an electrostatic generator 70. Completing the cell are one or more electrically conductive elements 66 which are connected to the opposite pole of the electrostatic generator through line 68. Typically elements 66 may comprise a plurality of thin wires formed of an electrically conductive metal, such as copper, aluminum and the like. Elements 66 are positioned between the fluid input of conduit 36 and sampling cell 20a.

In operation, opposite charges are applied to the poles of the generator. The fluid is then passed through input conduit 36, past elements 66 and through cell 20a. Particles are charged as they pass elements 66. The charged particles then tend to be attracted to elements 22a which will possess an opposite charge. As will be clear to one skilled in the art, such arrangement may enhance trapping of particles by cell 20a, and hence increase sensitivity of the system.

Still other modifications may be made in the apparatus and process of the present invention as will be apparent to one skilled in the art. For example, the optical and filter cell of the invention can be used for obtaining Raman spectra, e.g. by irradiating with monochromatic light having frequency chosen so that it does not correspond to any absorption by the sample.

It will be apparent that the present invention provides several advantages over conventional techniques heretofore commonly used. For one, the technique and apparatus of the present invention may provide enhanced sensitivity due to the filtering action of the optical cell. This in turn may allow analysis of extremely dilute concentrations of samples. Furthermore, the cell may be easily cleaned by back-flushing with clean fluid. Alternatively, the cell may be inexpensively produced so as to allow disposal after use.

Since certain changes may be made in the above apparatus and process without departing from the scope of the invention herein involved it is intended that all matter contained in the above description or shown in the accompanying drawings shall be interpreted in an illustrative and not in a limiting sense.

What is claimed is:

1. A spectroscopic device for analyzing particulates in a fluid and comprising in combination:

an optical cell comprising a plurality of elongated, substantially totally internally reflecting elements arranged as a mechanical filter capable of trapping said particulates;

means for directing a flow of sample-containing fluid through said cell; and means for examining the spectrum of radiation transmitted through said elements by internal reflection.

2. A device as defined in claim 1 wherein said elements are unsheathed.

3. A device as defined in claim 1 wherein said elements comprise a plurality of optical fibers.

4. A device as defined in claim 3 wherein said fibers are light pipes having an average cross section dimension less than about 500 micrometers.

5. A device as defined in claim 1 including a source of radiation capable of providing selected wavelength bands within a range of wavelengths.

6. A device as defined in claim 1 wherein said means for examining said spectrum is capable of responding to selected wavelength bands within a range of wavelengths.

7. A device as defined in claim 1 including optical platens coupled at opposite ends of said elements.

8. A device as defined in claim 1 wherein said elements are covered with an electrically conductive coating; and including at least one electrically conductive element positioned upstream of said cell with respect to the flow of sample-containing fluid; and means for applying electrical potentials of opposite sign across said electrically conductive coating and said electrically conductive element.

9. An optical cell comprising a plurality of elongated, substantially totally internally reflecting elements arranged as a mechanical filter and mechanically and electrically coupled at opposite ends to a pair of optically transmissive platens.

10. An optical cell as defined in claim 9 wherein said elements are unsheathed.

11. An optical cell as defined in claim 9 wherein said elements are sheathed with a material having substantially the same index of refraction as said elements and being optically transmissive to radiation which said elements can transmit.

12. An optical cell as defined in claim 9 wherein said elements comprise a plurality of optical fibers in the form of light pipes having average diameters of less than about 500 micrometers.

* * * * *